United States Patent
Xue

(10) Patent No.: US 9,330,254 B1
(45) Date of Patent: May 3, 2016

(54) SYSTEMS AND METHODS FOR PREVENTING THE INSTALLATION OF UNAPPROVED APPLICATIONS

(71) Applicant: Symantec Corporation, Mountain View, CA (US)

(72) Inventor: Yong Ling Xue, Beijing (CN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/462,869

(22) Filed: Aug. 19, 2014

(51) Int. Cl.
*G06F 21/00* (2013.01)
*G06F 21/51* (2013.01)

(52) U.S. Cl.
CPC ...................................... *G06F 21/51* (2013.01)

(58) Field of Classification Search
CPC ..... H04L 63/00; H04L 63/14; H04L 63/1433; G06F 8/61; G06F 21/51
USPC .......................................................... 726/22
See application file for complete search history.

(56) References Cited

U.S. PATENT DOCUMENTS

| | | | |
|---|---|---|---|
| 7,739,682 B1 * | 6/2010 | Badenell .................. | G06F 21/51 717/174 |
| 2003/0084439 A1 * | 5/2003 | Perkins ...................... | G06F 8/61 717/177 |
| 2006/0123101 A1 * | 6/2006 | Buccella ................ | G06F 21/552 709/223 |
| 2010/0275252 A1 * | 10/2010 | Yun ........................ | H04L 9/3236 726/7 |
| 2013/0054702 A1 * | 2/2013 | Belchee .................. | G06F 21/10 709/206 |
| 2014/0026228 A1 * | 1/2014 | Isozaki ................... | G06F 21/50 726/27 |

OTHER PUBLICATIONS

Yingsong Jia, et al; Systems and Methods for Providing Data Backup Services in a Virtual Environment; U.S. Appl. No. 14/445,032, filed Jul. 28, 2014.
Anubhav Savant, et al; Systems and Methods for Modifying Applications Without User Input; U.S. Appl. No. 14/445,704, filed Jul. 29, 2014.
Parmar, Ketan, "In Depth: Android Package Manager and Package Installer", http://java.dzone.com/articles/depth-android-package-manager, as accessed Jun. 24, 2014, DZone, Inc., (Oct. 20, 2013).

(Continued)

*Primary Examiner* — Yogesh Paliwal
(74) *Attorney, Agent, or Firm* — ALG Intellectual Property, LLC

(57) ABSTRACT

The disclosed computer-implemented method for preventing the installation of unapproved applications may include (1) determining that the computing device is pre-configured with a set of approved applications and (2) preventing the installation of unapproved applications onto the computing device by (a) monitoring processes running on the computing device via a daemon executing in the background of the computing device, (b) detecting, by monitoring the processes running on the computing device, an attempt to launch a process that facilitates the installation of applications onto the computing device, and (c) in response to detecting the attempt to launch the process, terminating the process before the process can facilitate the installation of an application onto the computing device. Various other methods, systems, and computer-readable media are also disclosed.

20 Claims, 6 Drawing Sheets

(56) References Cited

OTHER PUBLICATIONS

"SAFE for business. Samsung for Enterprise", http://www.samsung.com/us/business/samsung-for-enterprise/safe.html, as accessed Jun. 24, 2014, Samsung, (1995).

Spera, Chris, "3LM Enables Android Device Management for the Enterprise", http://www.informationweek.com/mobile/mobile-devices/3lm-enables-android-device-management-for-the-enterprise/d/d-id/1100788?, as accessed Jun. 24, 2014, InformationWeek, UBM Tech, (Oct. 18, 2011).

* cited by examiner

SYSTEMS AND METHODS FOR PREVENTING THE INSTALLATION OF UNAPPROVED APPLICATIONS

BACKGROUND

The distribution of sensitive and/or confidential data from personal computing devices to unauthorized parties represents a significant security threat for many organizations (e.g., organizations that handle classified research, financial information, customer information, etc.). In some cases, harmful data leaks may be facilitated by certain applications installed on a user's computing device. For example, a user may intentionally distribute confidential information via an unmonitored third-party messaging application. Alternatively, a user may download a seemingly innocuous application onto a computing device that contains malware used to gain access to sensitive data stored on the device without the user's knowledge.

As a result, administrators of an organization may wish to "lock down" the computing devices of users within the organization to ensure that the users cannot install harmful applications that may facilitate data leaks. Unfortunately, traditional methods for locking down computing devices may require implementing substantial changes to the operating system of a computing device, either during manufacture or after rooting the device. Such conventional methods may require that individuals within an organization all use a specific type of device and/or they may interrupt or impair a user's operation of a computing device when the device is rooted. As such, the present disclosure identifies and addresses a need for additional and improved systems and methods for preventing the installation of unapproved applications onto computing devices.

SUMMARY

As will be described in greater detail below, the instant disclosure describes various systems and methods for preventing the installation of unapproved applications by detecting the launch of a process that facilitates the installation of an application and terminating the process before the process can initiate the installation.

In one example, a computer-implemented method for performing such a task may include (1) determining that the computing device is pre-configured with a set of approved applications and (2) preventing the installation of unapproved applications onto the computing device by (a) monitoring processes running on the computing device via a daemon executing in the background of the computing device, (b) detecting, by monitoring the processes running on the computing device, an attempt to launch a process that facilitates the installation of applications onto the computing device, and (c) in response to detecting the attempt to launch the process, terminating the process before the process can facilitate the installation of an application onto the computing device. In some embodiments, the daemon may execute outside of the control of at least one task manager application on the computing device.

In some examples, determining that the computing device is pre-configured with the set of approved applications may include installing the approved applications onto the computing device. In these examples, preventing the installation of unapproved applications onto the computing device may include preventing the installation of any additional applications onto the computing device.

In some embodiments, monitoring the processes running on the computing device may include triggering an operating system on the computing device to send a notification to the daemon when the process that facilitates the installation of applications is launched. Additionally or alternatively, monitoring the processes running on the computing device may include periodically querying the operating system on the computing device for a list of the processes running on the computing device.

In some examples, the process that facilitates the installation of applications may include a process associated with an application distribution platform. In these examples, terminating the process before the process can facilitate the installation of the application may include terminating the process associated with the application distribution platform. In other examples, the process that facilitates the installation of applications onto the computing device may include a process associated with an installation management application that prompts a user of the computing device for permission to install applications onto the computing device. In these examples, the installation management application may prompt the user for permission to install third-party applications, applications downloaded from the Internet, and/or applications copied directly to storage on the computing device. Furthermore, in these examples, terminating the process before the process can facilitate the installation of the application may include terminating the process associated with the installation management application before the installation management applications prompts the user for permission to install the application.

In some embodiments, the method may further include monitoring the processes running on the computing device in order to detect that an unapproved application is executing on the computing device. In such embodiments, the method may then include terminating the unapproved application. Additionally, in some examples, the method may include monitoring the processes running on the computing device in order to detect that an additional process is attempting to uninstall an approved application from the computing device. In these examples, the method may include terminating the additional process before the approved application is uninstalled.

In one embodiment, a system for implementing the above-described method may include (1) a determination module that determines that the computing device is pre-configured with a set of approved applications and (2) a prevention module that prevents the installation of unapproved applications onto the computing device by (a) monitoring processes running on the computing device via a daemon executing in the background of the computing device, (b) detecting, by monitoring the processes running on the computing device, an attempt to launch a process that facilitates the installation of applications onto the computing device, and (c) in response to detecting the attempt to launch the process, terminating the process before the process can facilitate the installation of an application onto the computing device. In addition, the system may include at least one processor that executes the determination module and the prevention module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) determine that the computing device is pre-configured with a set of approved applications and (2) prevent the installation of unapproved applications onto the computing device by (a) monitoring processes running on the computing device via a daemon executing in the background of the computing device, (b) detecting, by monitoring the processes running on the computing device, an attempt to launch a process that facilitates the installation of applications onto the computing device, and (c) in response to detecting the attempt to launch the process, terminating the process before the process can facilitate the installation of an application onto the computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
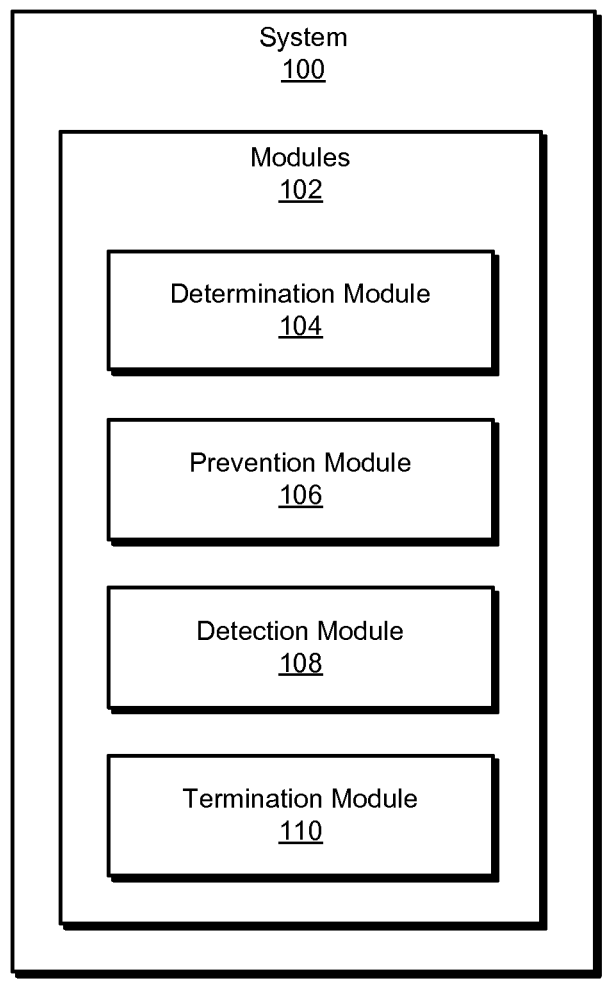
FIG. 1 is a block diagram of an exemplary system for preventing the installation of unapproved applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preventing the installation of unapproved applications onto computing devices. As will be explained in greater detail below, by monitoring the processes running on a computing device via a daemon executing in the background of the computing device, the disclosed systems and methods may detect the launch of processes that facilitate the installation of applications without requiring modifications to the computing device's operating system. In addition, by terminating such processes before they can initiate the installation of additional applications, the disclosed systems may prevent the installation of unwanted applications onto a computing device that contain malicious content, may be used to distribute sensitive data, and/or perform additional undesirable behaviors, therefore increasing the safety and security of the computing device.

Figure 2:
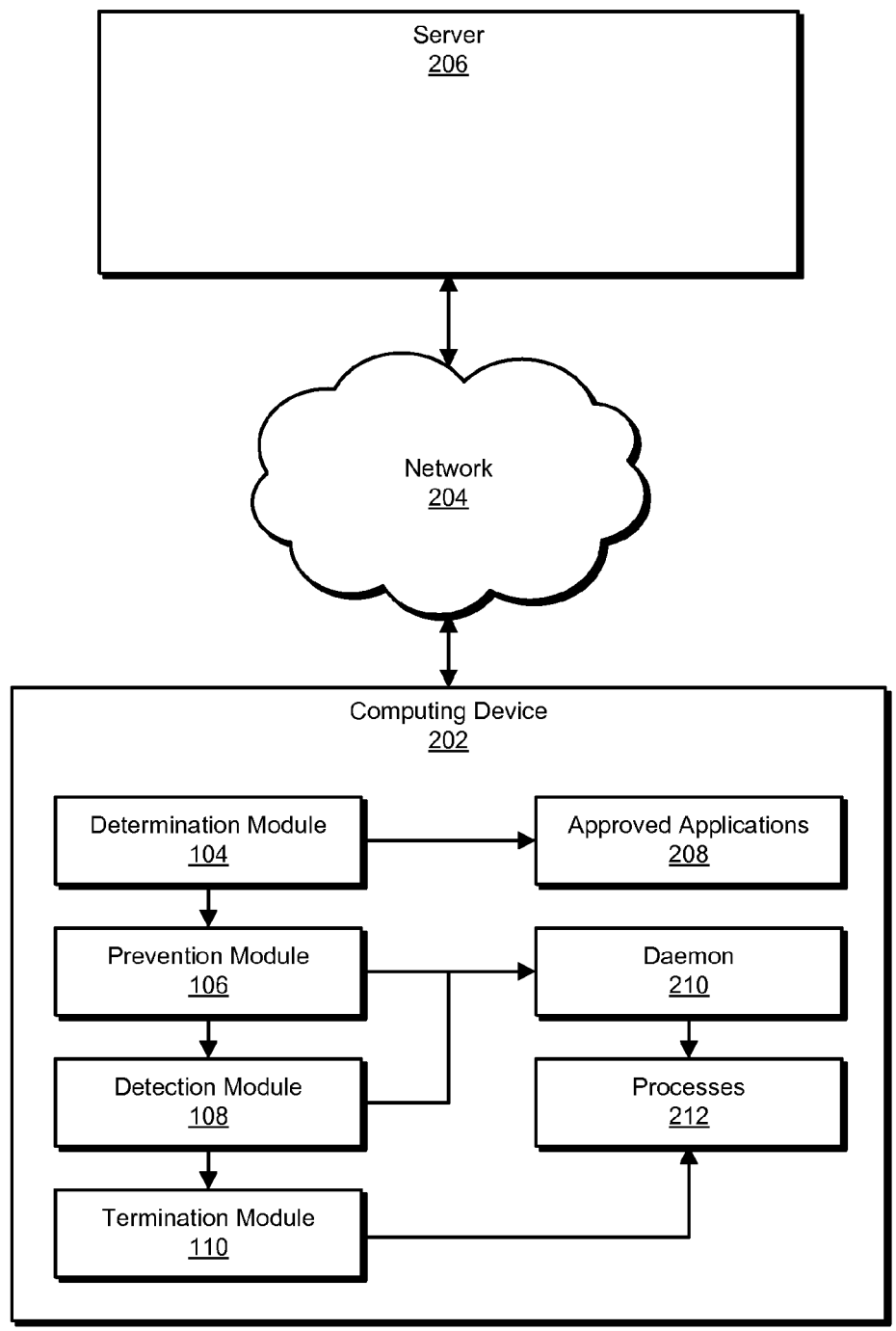
FIG. 2 is a block diagram of an additional exemplary system for preventing the installation of unapproved applications.
Figure 3:
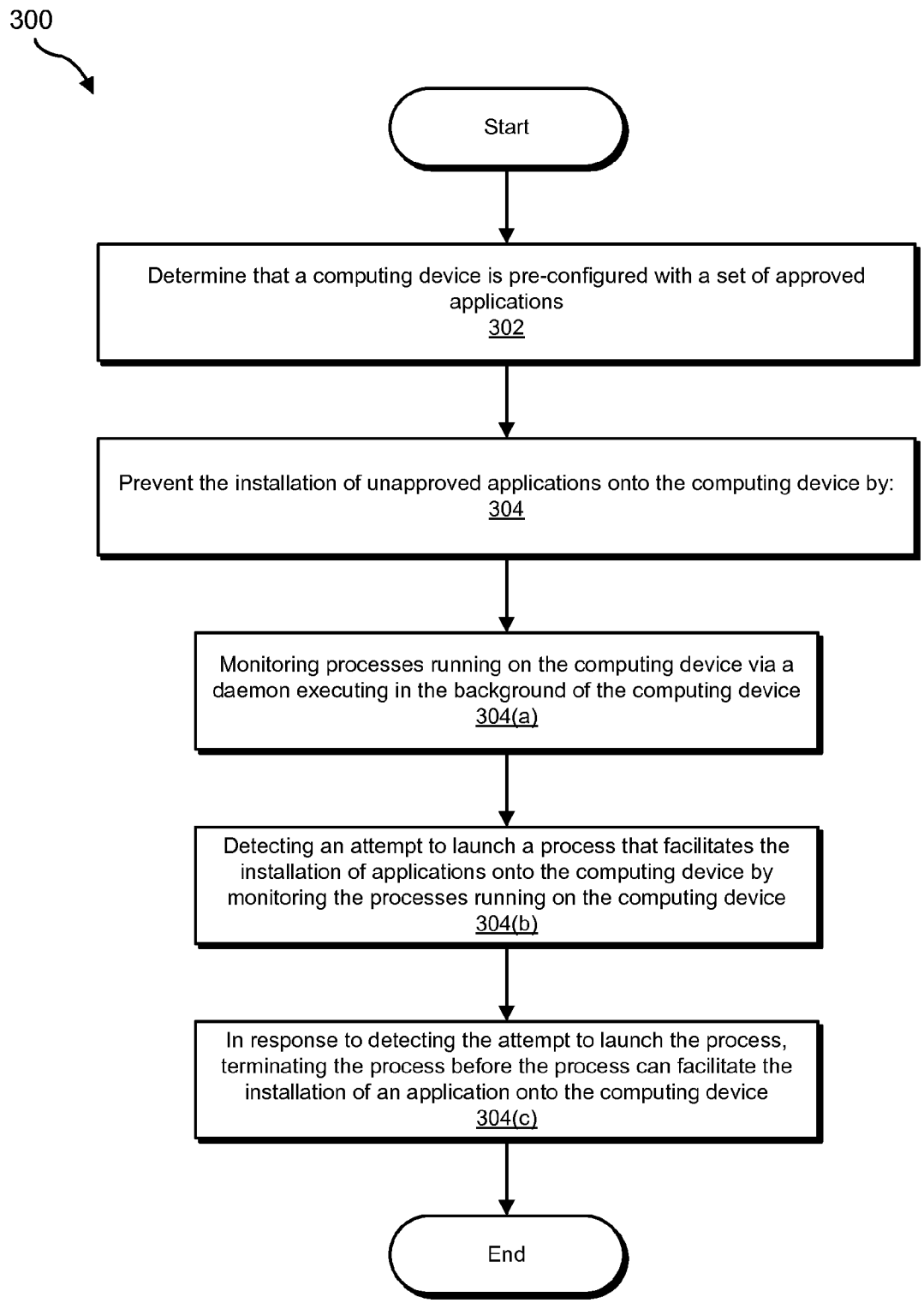
FIG. 3 is a flow diagram of an exemplary method for preventing the installation of unapproved applications.
Figure 4:
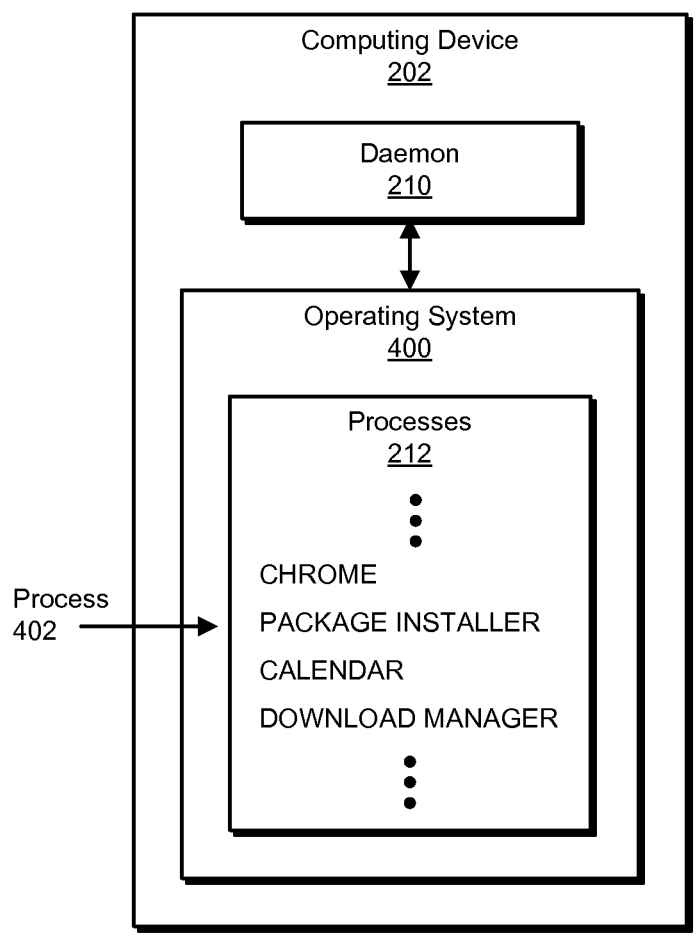
FIG. 4 is a diagram of an exemplary list of processes running on a computing device.

The following will provide, with reference to FIGS. 1, 2 and 4, detailed descriptions of exemplary systems for preventing the installation of unapproved applications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for preventing the installation of unapproved applications. As illustrated in this figure, exemplary system 100 may include one or more modules 102 for performing one or more tasks. For example, and as will be explained in greater detail below, exemplary system 100 may include a determination module 104 that determines that a computing device is pre-configured with a set of approved applications. Exemplary system 100 may also include a prevention module 106 that prevents the installation of unapproved applications onto the computing device by (1) monitoring processes running on the computing device via a daemon executing in the background of the computing device, (2) detecting, by monitoring the processes running on the computing device, an attempt to launch a process that facilitates the installation of applications onto the computing device, and (3) in response to detecting the attempt to launch the process, terminating the process before the process can facilitate the installation of an application onto the computing device.

In addition, and as will be described in greater detail below, exemplary system 100 may include a detection module 108 that detects that an unapproved application is executing on the computing device and/or detects that an additional process is attempting to uninstall an approved application from the computing device. Furthermore, exemplary system 100 may include a termination module 110 that terminates the unapproved application and/or the additional process that is attempting to uninstall the approved application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 in order to detect and terminate processes that facilitate installing unapproved applications onto computing device 202. Additionally or alternatively, server 206 may be programmed with one or more of modules 102 in order to analyze processes that may facilitate installing unapproved applications onto computing device 202.

In one embodiment, one or more of modules 102 from FIG. 1 may, when executed by at least one processor of computing device 202 and/or server 206, enable computing device 202 and/or server 206 to prevent the installation of unapproved applications. For example, and as will be described in greater detail below, determination module 104 may cause computing device 202 and/or server 206 to determine that a computing device (e.g., computing device 202) is pre-configured with a set of approved applications (e.g., approved applications 208). In addition, prevention module 106 may cause computing device 202 and/or server 206 to prevent the installation of unapproved applications onto the computing device by (1) monitoring processes (e.g., processes 212) running on the computing device via a daemon (e.g., daemon 210) executing in the background of the computing device, (2) detecting, by monitoring the processes running on the computing device, an attempt to launch a process that facilitates the installation of applications onto the computing device, and (3) in response to detecting the attempt to launch the process, terminating the process before the process can facilitate the installation of an application onto the computing device.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of identifying and/or analyzing processes that facilitate the installation of applications. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for preventing the installation of unapproved applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may determine that a computing device is pre-configured with a set of approved applications. For example, determination module 104 may, as part of computing device 202 in FIG. 2, determine that computing device 202 is pre-configured with approved applications 208.

The term "application," as used herein, generally refers to any type or form of software, file, or executable code that may be installed, run, deployed, or otherwise implemented on a computing system. Examples of applications include, without limitation, web browsers, operating systems, communication applications, word and number processing applications, gaming applications, security applications, cloud-based applications, and media applications.

The systems described herein may determine that the computing device is pre-configured with the set of approved applications in a variety of ways. In some examples, determination module 104 may determine that computing device 202 has been pre-configured with approved applications 208 as part of implementing an application whitelist on computing device 202. The term "application whitelist," as used herein, generally refers to any type of list or grouping of approved, acceptable, or allowed applications that may be installed on a computing device. In some examples, an administrator of computing device 202 may define an application whitelist for computing device 202 that includes applications known to be beneficial to the security and/or performance of computing device 202 and that excludes applications that may potentially compromise the security and/or performance of computing device 202. Specifically, an application whitelist may exclude applications that may allow a user to inadvertently or intentionally distribute sensitive information.

In some examples, determination module 104 may configure computing device 202 with approved applications 208. For example, determination module 104 may install approved applications 208 onto computing device 202 and/or uninstall any applications previously installed on computing device 202 that are not included within approved applications 208. Additionally or alternatively, determination module 104 may determine that a user and/or administrator of computing device 202 has pre-configured computing device 202 with approved applications 208. Computing device 202 may be configured with approved applications 208 at any point during or after the manufacture of computing device 202.

Returning to FIG. 3, at steps 304(a)-(c) one or more of the systems described herein may prevent the installation of unapproved applications onto the computing device by (1) monitoring processes running on the computing device via a daemon executing in the background of the computing device, (2) detecting, by monitoring the processes running on the computing device, an attempt to launch a process that facilitates the installation of applications onto the computing device, and (3) in response to detecting the attempt to launch the process, terminating the process before the process can facilitate the installation of an application onto the computing device. For example, prevention module 106 may, as part of computing device 202 in FIG. 2, prevent the installation of unapproved applications onto computing device 202 by (1) monitoring processes 212 running on computing device 202 via daemon 210, (2) detecting the attempt to launch a process that facilitates the installation of an application onto computing device 202, and (3) in response to detecting the attempt to launch the process, terminating the process before the process can facilitate the installation of the application.

The term "daemon," as used herein, generally refers to any type or form of application, executable code, or computer program that runs as a background process (i.e., as opposed to a foreground process). For example, a daemon may execute without requesting or requiring instruction from a user. In addition, the term "process," as used herein, generally refers to any type or form of computer program, application, service, or portion of executable code that is currently running on a computing device.

In some examples, prevention module 106 may monitor processes 212 by installing or injecting daemon 210 into computing device 202. Additionally, in some embodiments, prevention module 106 may configure daemon 210 to execute in the background of computing device 202 such that daemon 210 may not interfere with a user's operation of computing device 202 when the user is not attempting to install an application. Prevention module 106 may also configure daemon 210 to execute outside of the control of one or more applications on computing device 202. For example, prevention module 106 may place daemon 210 outside of the control of the operating system and/or a task manager application that facilitates launching and/or terminating processes executing on computing device 202. In this way, a user or additional application (such as a task manager) may be unable to terminate or circumvent daemon 210 in order to install unapproved applications onto computing device 202.

Notably, daemon 210 may represent an addition to computing device 202, rather than a modification to the operating system or other application on computing device 202. As such, prevention module 106 may deploy daemon 210 on computing device 202 at any point during or after the manufacture or configuration of computing device 202. Therefore, the systems described herein may allow an administrator to maintain an application whitelist on computing device 202 without rooting computing device 202 or requiring a specially-designed operating system.

As an example, FIG. 4 illustrates daemon 210 deployed within computing device 202. As shown in FIG. 4, daemon 210 may operate outside of an operating system 400 installed on computing device 202. In addition, daemon 210 may monitor and/or communicate with operating system 400 in order to identify processes 212 executing within operating system 400.

The systems described herein may monitor processes 212 running on computing device 202 via daemon 210 in a variety of ways. In some embodiments, prevention module 106 may configure daemon 210 to periodically query the operating system on computing device 202 for a list of currently-running processes. For example, daemon 210 may query a process manager or database incorporated into the operating system of computing device 202 that stores a log of processes 212. In addition, daemon 210 may query a third-party process manager or other application downloaded onto computing device 202 that tracks processes 212. Daemon 210 may periodically query the operating system for processes 212 at any rate (e.g., every 100 ms, every 2 seconds, etc.) sufficient to detect and terminate a process before the process can be used to facilitate the installation of an application, as will be explained in greater detail below.

Additionally or alternatively, prevention module 106 may leverage notification mechanisms within computing device 202 in order to monitor processes 212. For example, prevention module 106 may configure daemon 210 to trigger the operating system on computing device 202 to send a notification to daemon 210 when one or more particular processes that facilitate the installation of applications are launched. Specifically, in some examples, daemon 210 may trigger the operating system to send a notification to daemon 210 when a process associated with an application distribution platform is launched on computing device 202. The term "application distribution platform," as used herein, generally refers to any type or form of online service, application, or software framework used to deliver media content to users via a network. Application distribution platforms may distribute a variety of media types, such as text, audio, and video files, gaming applications, security applications, work-related applications, and/or any additional type of media. Examples of application distribution platforms include, without limitation, GOOGLE PLAY, AMAZON APPSTORE, WINDOWS STORE, and APP STORE (for iOS).

In some examples, daemon 210 may trigger the operating system to send a notification to daemon 210 when a process associated with an installation management application is launched. The term "installation management application," as used herein, generally refers to any type or form of service, process, or executable code that requires and prompts a user for permission to install an application before allowing installation of the application onto a computing device. An installation management application may be launched when a user or service attempts to install an application from an application distribution platform, when an application is downloaded from the Internet, and/or when an application is copied directly to storage. For example, upon detecting that an application package (e.g., an APK file) is requesting installation, an installation management application (e.g., PACKAGEINSTALLER for ANDROID) may generate a graphical user interface, menu, and/or dialog box that prompts a user for input to grant permission to install the application (by, e.g., clicking an "accept" or "install" button). In this example, the installation management application may only permit the installation of the application upon receiving permission (via, e.g., the appropriate input) from the user.

While monitoring processes 212 on computing device 202, prevention module 106 may detect an attempt to launch a process that facilitates the installation of applications onto the computing device. For example, if daemon 210 periodically queries the operating system on computing device 202 for a list of processes 212, prevention module 106 may identify one or more processes associated with an application distribution platform and/or an installation management application within the list of processes 212. In some examples, prevention module 106 may search the list of processes 212 for a specific process known to facilitate the installation of applications. Additionally or alternatively, prevention module 106 may analyze each of processes 212 for an indication that the process can facilitate the installation of applications. Furthermore, in some examples, prevention module 106 may detect the attempt to launch the process that facilitates the installation of applications by determining that daemon 210 received a notification from the operating system that indicates that the process has been launched.

Referring to the example of FIG. 4, demon 210 may, by querying operating system 400, identify a list of processes 212 running on computing device 202. As shown in FIG. 4, processes 212 may include the processes "CHROME," "PACKAGE INSTALLER," CALENDAR," and "DOWNLOAD MANAGER." In this example, daemon 210 may detect the attempt to launch the process that facilitates the installation of applications by identifying process 402 ("PACKAGE INSTALLER") within processes 212.

Once prevention module 106 detects the attempt to launch the process, prevention module 106 may terminate the process before the process can facilitate the installation of an application onto computing device 202. The phrase "terminate," as used herein, generally refers to any type or form of action taken to shut down, kill, block, or otherwise prevent an application from executing. Prevention module 106 may facilitate (e.g., via daemon 210) terminating the process in a variety of ways, including by directly terminating the process, or by directing the operating system, a task manager application, and/or additional application on computing device 202 to terminate the process.

In some examples, if prevention module 106 detected the launch of a process associated with an application distribution platform, prevention module 106 may terminate the process associated with an application distribution platform before a user or service can utilize the application distribution platform to install an application. For example, prevention module 106 may terminate the process before the application distribution platform is presented to the user or before the user is able to click a button within the application distribution platform that installs an application. In another example, if prevention module 106 detected the launch of a process associated with an installation management application, prevention module 106 may terminate the process associated with the installation management application before the installation management application can provide a user interface that prompts the user for permission to install the application. In these examples, launching the user interfaces required for a user or service to initiate the installation process may require a certain amount of time (e.g., 200 ms). By detecting and terminating an attempt to launch such user interfaces before this time period, prevention module 106 may prevent the installation of all applications onto computing device 202 before the installation process has even begun (e.g., rather than analyzing applications for security threats as they are installed).

In some examples, the systems and methods described herein may be used to lock down computing device 202. The phrase "lock down," as used herein, generally refers to any process or action taken to prevent potentially harmful modifications to the configuration of a computing device. In some examples, prevention module 106 may lock down computing device 202 by preventing the installation of any applications onto computing device 202 after determination module 104 and/or an administrator of computing device 202 configures computing device 202 with approved applications 208. In some embodiments, prevention module 106 may further lock down computing device 202 by preventing a user or service from uninstalling any of approved applications 208 from computing device 202. Similarly to prevention module 106 monitoring processes 212 to detect an attempt to launch a process that facilitates the installation of applications, detection module 108 may, by monitoring processes 212, detect that an additional process (e.g., a process associated with an installation management application that facilitates the uninstallation of applications) is attempting to uninstall one or more of approved applications 208. In this example, termination module 110 may then terminate the additional process before the approved application is uninstalled. Furthermore, in some examples, detection module 108 may, by monitoring processes 212, detect that an unapproved application (e.g., an application not included within approved applications 208) is executing on computing device 202. In response to detecting the unapproved application, termination module 110 may terminate any processes associated with the unapproved application.

The systems described herein may be implemented in a variety of ways and provide a number of advantages. As explained above, by monitoring the processes running on a computing device via a daemon executing in the background of the computing device, the disclosed systems and methods may detect the launch of processes that facilitate the installation of applications without requiring modifications to the computing device's operating system. In addition, by terminating such processes before they can initiate the installation of additional applications, the disclosed systems may prevent the installation of unwanted applications onto a computing device that contain malicious content, may be used to distribute sensitive data, and/or perform additional undesirable behaviors, therefore increasing the safety and security of the computing device.

Figure 5:
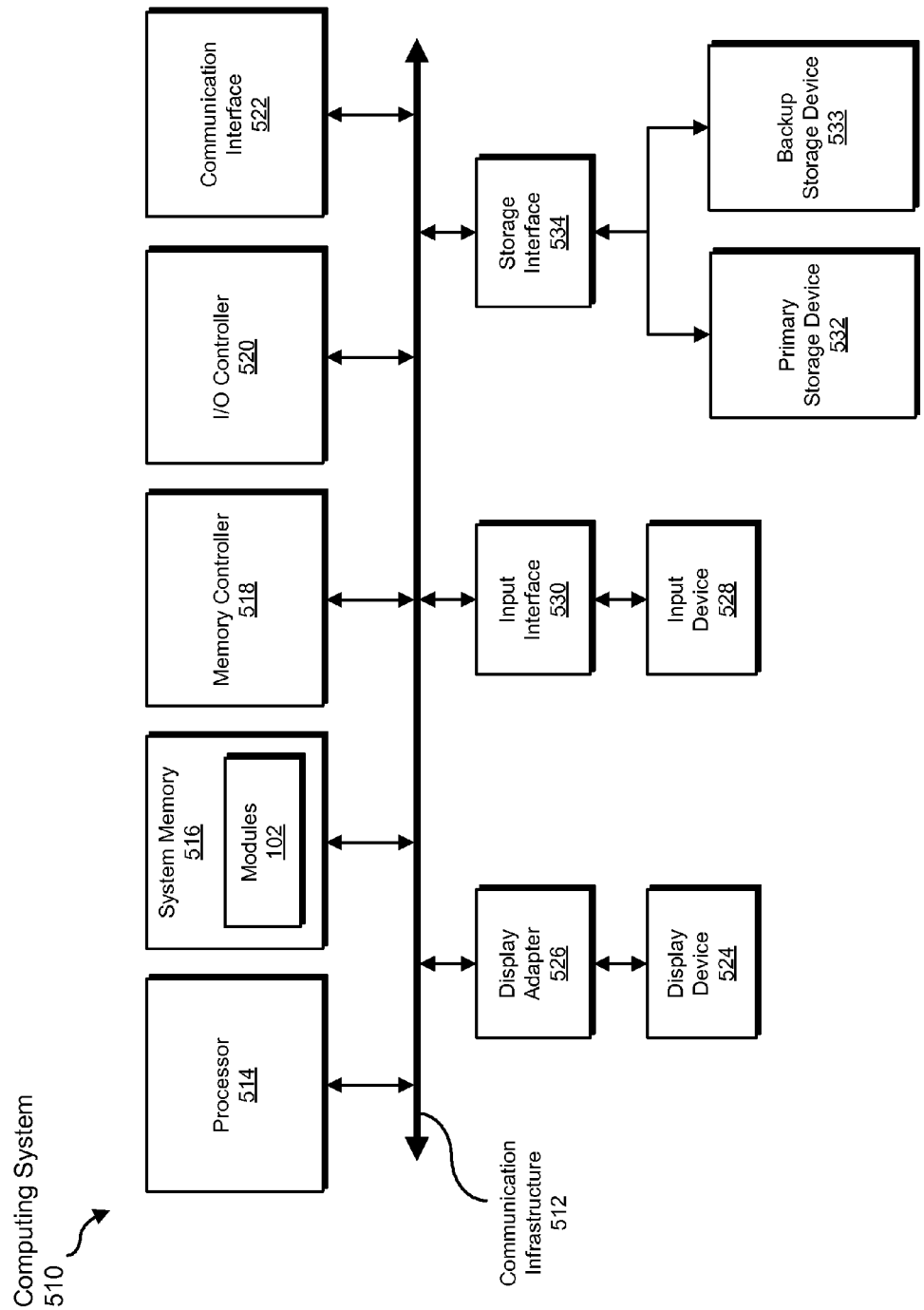
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
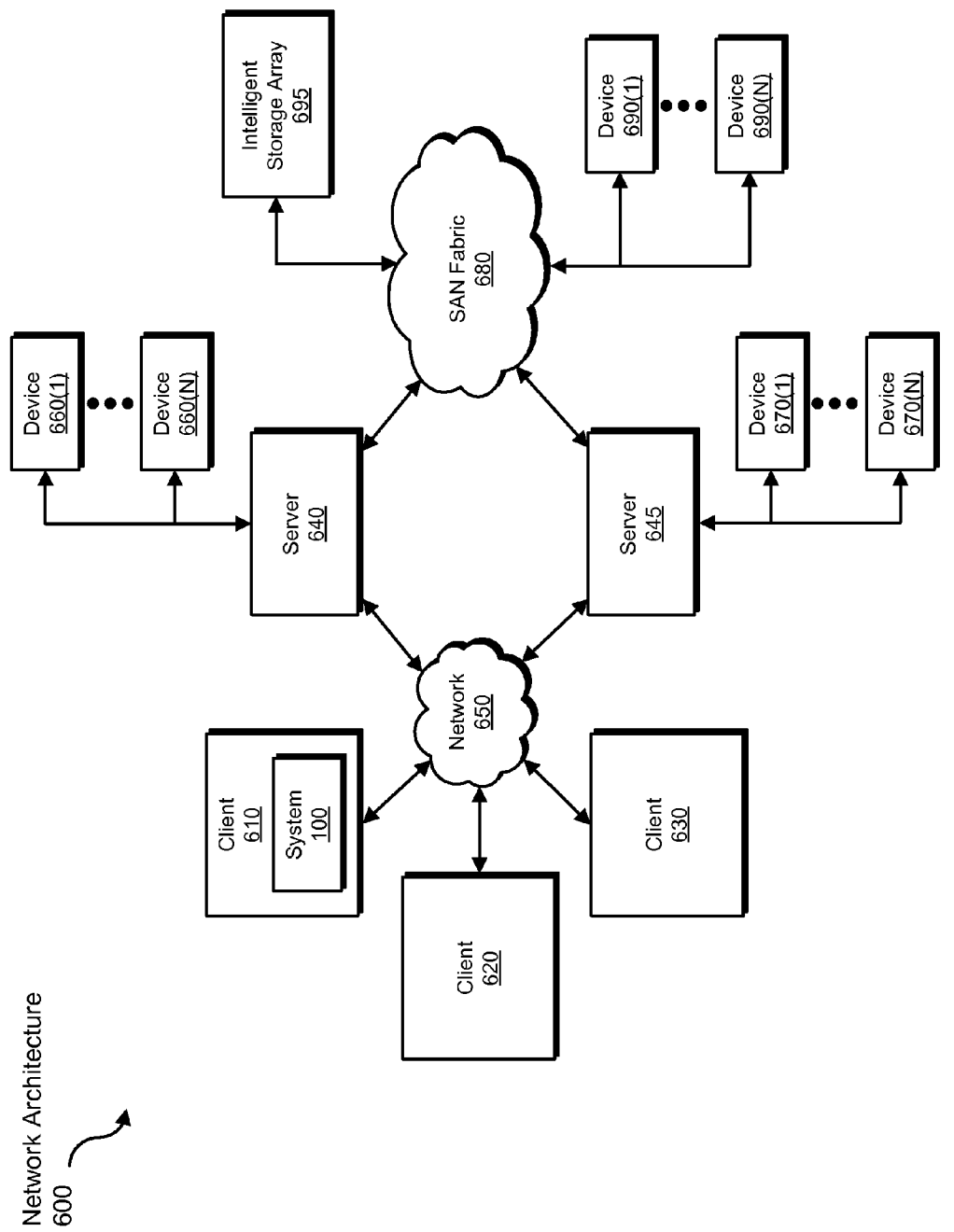
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for preventing the installation of unapproved applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data associated with processes executing on a computing device, transform the data into detection of an attempt to install an application onto the computing device, and use the result of the transformation to prevent the installation of the application onto the computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing the installation of unapproved applications, at least a portion of the method being performed by a computing device comprising at least one processor, the method comprising:
   determining that the computing device is pre-configured with a set of approved applications;
   preventing the installation of unapproved applications onto the computing device by:
      monitoring, via a daemon executing in a background of the computing device, processes running on the computing device;
      detecting, by monitoring the processes running on the computing device, an attempt to launch a process that facilitates the installation of applications onto the computing device, wherein the process:
         prompts a user of the computing device to provide input into a user interface to initiate the installation of applications;
         requires a certain amount of time to launch the user interface after the process is launched;

in response to detecting the attempt to launch the process, terminating the process before the amount of time required by the process to launch the user interface has passed.

2. The method of claim 1, wherein:
determining that the computing device is pre-configured with the set of approved applications comprises installing the approved applications onto the computing device;
preventing the installation of unapproved applications onto the computing device comprises preventing the installation of any additional applications onto the computing device.

3. The method of claim 1, wherein monitoring the processes running on the computing device comprises at least one of:
triggering an operating system on the computing device to send a notification to the daemon when the process that facilitates the installation of applications is launched;
periodically querying the operating system on the computing device for a list of the processes running on the computing device.

4. The method of claim 1, wherein the process that facilitates the installation of applications comprises a process associated with an application distribution platform.

5. The method of claim 1 wherein:
the process that facilitates the installation of applications onto the computing device comprises a process associated with an installation management application;
the process associated with the installation management application prompts the user of the computing device to provide input to initiate the installation of applications by prompting the user to provide permission to install applications onto the computing device;
terminating the process associated with the installation management application comprises terminating the process before the user can provide permission to install an application.

6. The method of claim 5, wherein the installation management application prompts the user for permission to install at least one of:
third-party applications;
applications downloaded from the internet;
applications copied directly to storage on the computing device.

7. The method of claim 1, wherein the daemon executes outside of the control of at least one task manager application on the computing device.

8. The method of claim 1, further comprising:
detecting, by monitoring the processes running on the computing device, that an unapproved application is executing on the computing device;
terminating the unapproved application in response to detecting that the unapproved application is executing.

9. The method of claim 1, further comprising:
detecting, by monitoring the processes running on the computing device, that an additional process is attempting to uninstall an approved application from the computing device;
terminating the additional process before the approved application is uninstalled.

10. A system for preventing the installation of unapproved applications, the system comprising:
a determination module, stored in memory, that determines that a computing device is pre-configured with a set of approved applications;
a prevention module, stored in memory, that prevents the installation of unapproved applications onto the computing device by:
monitoring, via a daemon executing in a background of the computing device, processes running on the computing device;
detecting, by monitoring the processes running on the computing device, an attempt to launch a process that facilitates the installation of applications onto the computing device, wherein the process:
prompts a user of the computing device to provide input into a user interface to initiate the installation of applications;
requires a certain amount of time to launch the user interface after the process is launched;
in response to detecting the attempt to launch the process, terminating the process before the amount of time required by the process to launch the user interface has passed;
at least one hardware processor that executes the determination module and the prevention module.

11. The system of claim 10, wherein:
the determination module determines that the computing device is pre-configured with the set of approved applications by installing the approved applications onto the computing device;
the prevention module prevents the installation of unapproved applications onto the computing device by preventing the installation of any additional applications onto the computing device.

12. The system of claim 10, wherein the prevention module monitors the processes running on the computing device by at least one of:
triggering an operating system on the computing device to send a notification to the daemon when the process that facilitates the installation of applications is launched;
periodically querying the operating system on the computing device for a list of the processes running on the computing device.

13. The system of claim 10, wherein the process that facilitates the installation of applications comprises a process associated with an application distribution platform.

14. The system of claim 10 wherein:
the process that facilitates the installation of applications onto the computing device comprises a process associated with an installation management application;
the process associated with the installation management application prompts the user of the computing device to provide input to initiate the installation of applications by prompting the user to provide permission to install applications onto the computing device;
the prevention module terminates the process associated with the installation management application by terminating the process before the user can provide permission to install an application.

15. The system of claim 14, wherein the installation management application prompts the user for permission to install at least one of:
third-party applications;
applications downloaded from the internet;
applications copied directly to storage on the computing device.

16. The system of claim 10, wherein the daemon executes outside of the control of at least one task manager application on the computing device.

17. The system of claim 10, further comprising:
- a detection module, executed by the hardware processor, that detects, by monitoring the processes running on the computing device, that an unapproved application is executing on the computing device;
- a termination module, executed by the hardware processor, that terminates the unapproved application in response to detecting that the unapproved application is executing.

18. The system of claim 10, further comprising:
- a detection module, executed by the hardware processor, that detects, by monitoring the processes running on the computing device, that an additional process is attempting to uninstall an approved application from the computing device;
- a termination module, executed by the hardware processor, that terminates the additional process before the approved application is uninstalled.

19. A non-transitory computer-readable medium comprising one or more computer-executable instructions that, when executed by at least one processor of a computing device, cause the computing device to:
- determine that the computing device is pre-configured with a set of approved applications;
- prevent the installation of unapproved applications onto the computing device by:
  - monitoring, via a daemon executing in a background of the computing device, processes running on the computing device;
  - detecting, by monitoring the processes running on the computing device, an attempt to launch a process that facilitates the installation of applications onto the computing device, wherein the process:
    - prompts a user of the computing device to provide input into a user interface to initiate the installation of applications;
    - requires a certain amount of time to launch the user interface after the process is launched;
  - in response to detecting the attempt to launch the process, terminating the process before the amount of time required by the process to launch the user interface has passed.

20. The computer-readable medium of claim 19, wherein the computer-executable instructions cause the computing device to monitor the processes running on the computing device by at least one of:
- triggering an operating system on the computing device to send a notification to the daemon when the process that facilitates the installation of applications is launched;
- periodically querying the operating system on the computing device for a list of the processes running on the computing device.

\* \* \* \* \*